United States Patent [19]
Jones et al.

[11] Patent Number: 5,353,074
[45] Date of Patent: Oct. 4, 1994

[54] COMPUTER CONTROLLED ANIMATION PROJECTION SYSTEM

[75] Inventors: Raymond D. Jones, Lake Elizabeth; Christopher M. Wagner, Saugus; George T. Katanics, Burbank, all of Calif.

[73] Assignee: The Walt Disney Company, Burbank, Calif.

[21] Appl. No.: 888,544

[22] Filed: May 22, 1992

[51] Int. Cl.$^5$ ............... G03B 21/00; G03B 21/00
[52] U.S. Cl. ............................ 353/122; 353/28; 353/46; 395/125; 345/122
[58] Field of Search ............... 353/28, 30, 46, 122, 353/10; 472/59, 60, 61; 359/478; 358/60, 231, 88, 3; 395/125; 340/723-726

[56]  References Cited
U.S. PATENT DOCUMENTS

| | | | |
|---|---|---|---|
| 4,406,428 | 9/1983 | Ferris | 353/28 |
| 4,439,759 | 3/1984 | Fleming et al. | 340/723 |
| 4,439,760 | 3/1984 | Fleming | 340/703 |
| 4,752,836 | 6/1988 | Blanton et al. | 395/152 |
| 4,951,151 | 8/1990 | Sorenson et al. | 353/28 |

Primary Examiner—William A. Cuchlinski, Jr.
Assistant Examiner—William C. Dowling
Attorney, Agent, or Firm—Hecker & Harriman

[57] ABSTRACT

A computer controlled animation projection system is described. The system permits the projection of animated images onto a three dimensional projection surface, whether or not the surface is originally designed as a projection surface. The system comprises an animation source that can be edited using a processing means, a projection means, and an interface for coupling the animation source to the projection means. In operation of the present invention, a projection surface is selected, and an animation sequence is projected onto the projection surface. Portions of the projection surface upon which no image is to be projected are identified. Using a paint program, the background or projected frame is edited to "black out" those regions of the projected image that are projected onto those identified portions. This is done while the image is still being projected, so that the changes are viewed as they are made. The regions of the projected image corresponding to the identified portions of the projection surface are colored black (no light) so that no light is projected onto those identified portions. This is done to allow "blending" of the projected image into the projected surface, reducing artifacts and boundaries that reveal the presence of a projected image.

38 Claims, 9 Drawing Sheets

FIG. 1 PRIOR ART
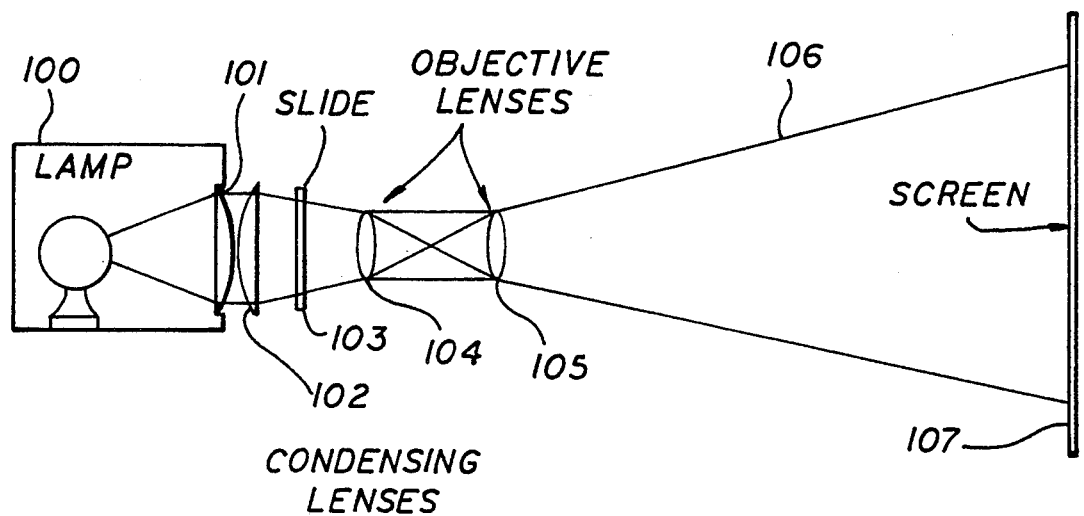
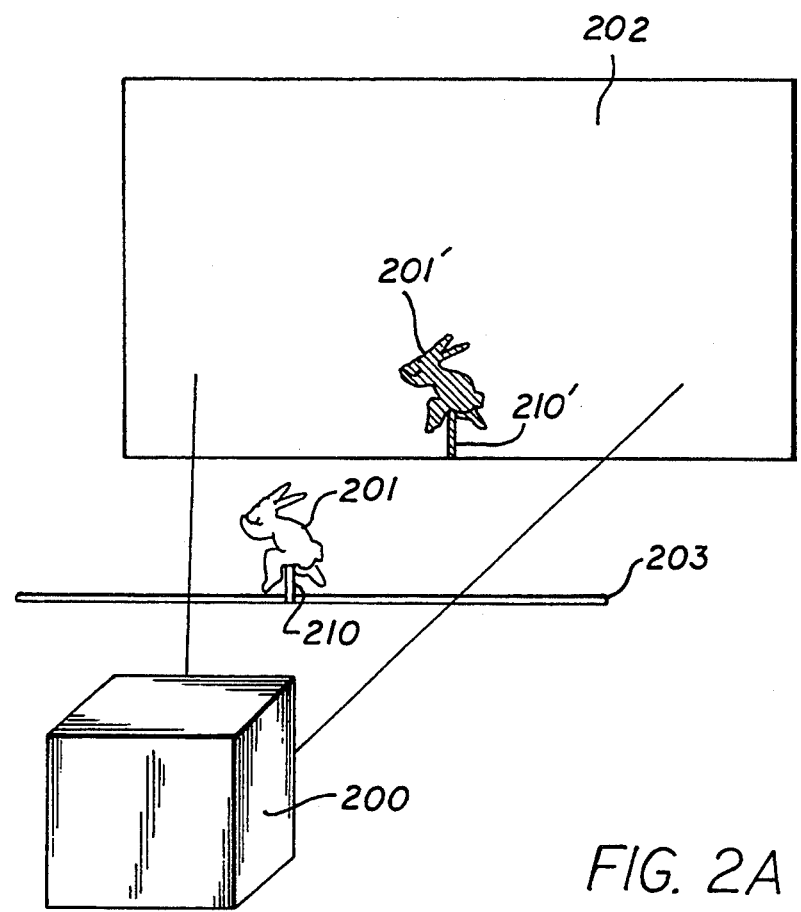
FIG. 2A
PRIOR ART

COMPUTER CONTROLLED ANIMATION PROJECTION SYSTEM

BACKGROUND OF THE PRESENT INVENTION

1. Field of the Invention

This invention relates to the field of animation projection systems.

2. Background Art

In entertainment applications, a set is often created to provide an artificial environment. These entertainment applications may include, for example, live stage presentations, theme park rides, and museum exhibits. These entertainment applications often use special effects to add to the perceived reality of the artificial environment. Special effects often include elements of lighting, sound, scenery, and/or visual cues to artificially create the visual and environmental impression of natural phenomena, such as fire, rain, clouds, snow, wind, sunlight, etc, or of imaginary phenomena, such as unpowered human flight, mythical creatures, animated cartoon characters, and other fanciful things.

Prior art apparatus used to create visual effects have included the use of projectors to project an image that is combined with physical scenery to provide a desired "combination" image. One such projector is known as a "sciopticon". An example of a sciopticon is illustrated in FIG. 1. The sciopticon includes a light source, such as lamp 100, for projecting light through condensing lenses 101 and 102. The light output of the condensing lenses 101 and 102 is projected through a slide 103. The slide 103 may be a rotatable disk that includes a transparent painted effect, such as, for example, "rippling water", clouds, rain, snow, or moonlight. The output of the slide 103 is projected through an objective lens assembly (objective lenses 104 and 105) to produce an image 106. The image 106 is projected onto a screen 107 or other flat surface.

In some circumstances, it is desired to simply project the outline or shadow of a moving character onto a surface or scene. A prior art technique to accomplish this utilizes a mechanical model of a character, referred to as a "maquette". The maquette is placed between a light source and a surface so that the shadow of the maquette is projected onto the surface. Such a scheme is illustrated in FIG. 2A. In FIG. 2A, the light source 200 is disposed some distance away from a projection surface 202. A maquette 201 is placed between the light source 200 and the surface 202. The maquette 201 may be mounted on a track 203 via mounting post 210. Motive force is applied to the maquette so that its shadow appears to move across the projection surface. Often, the maquette 201 is mounted on a circular or looped track so that it rotates through the light beam during one portion of a revolution and is hidden from sight during the remaining portion of the revolution. A disadvantage of the use of a maquette is that the shadow 210' of the mounting post 210 is also projected onto the projection surface. This detracts from the realism of the environment.

Referring now to FIG. 2B, the maquette 201 is shown mounted on a loop track 204. The track 204 itself is disposed in a housing 205 so that it does not cast a shadow onto the projection surface 202. As the track is turned, the maquette 201 is in a path between the projector 200 and the projection surface 202 in the approximate upper half of the loop defined by the track 204, from positions 207 to 208. During this time, the shadow 201' of the maquette 201 is projected onto surface 202 and appears to "move" across the surface 202 as the track turns. At position 208, the maquette is rotated below the level of the housing 205 so that no shadow of the maquette is projected. The track continues to turn and the maquette returns to position 207 and the cycle of shadow projection and shadow masking is repeated. The scheme of FIG. 2B also has the disadvantage of the projection of the shadow 210' of the mounting post 210.

Instead of a maquette, a shadow mask, (referred to as a "gobo"), may be installed at the focal plane of the projector, thereby casting a silhouette on the projection surface. However, such a scheme is not suitable for animated characters or imagery.

The prior art projection schemes described above both have the disadvantage of requiring a substantially fiat projection surface for suitable operation and to accomplish their desired visual effects. This requires the inclusion of a fiat planar surface in the midst of a three dimensional scene or set. The presence of such a fiat planar surface is typically obvious and visually "jarring" to the observer. It provides an undesirable reminder that the environment is artificial, and disrupts the desired continuity and visual integration of the effect. This is a particular problem in the theme park attraction and "dark ride" industry. A dark ride is a ride that includes transportation of a rider or riders through a light controlled region. The interior region may be intended to represent a tunnel, the inside of a mountain, a house, or an outdoor scene.

The intention of many theme park attractions is to give the impression that the rider is being transported through a fully dimensioned and visually uniform and integrated fantasy world. Fully dimensioned means the use of three dimensional sets and set pieces, the use of textured surfaces, color, sound, and lighting to give the illusion of reality. Often the interiors of these environments is comprised of three dimensional sculpted forms made from plaster, foam, and concrete. These forms are often referred to as "rock-work". The inclusion of a relatively fiat projection surface with the three dimensional surfaces of the rock-work detracts from the overall impression of the space and becomes an obvious, artificial object itself.

Another disadvantage of the prior art projection schemes and apparatus described above is the time intensive nature of the set-up required for these systems, and the requirement for having fixed preinstallation dimensions, objects, angles, textures, and placements of the systems in the entertainment environments. This is often at odds with the construction of theme park attractions. These visual effects are typically the last component to be installed in an attraction, often just days prior to opening of the attraction. The nature of construction of rock-work, the last minute changes of designs, the placement of other support systems for the attractions, (air conditioning, electrical cabling, lighting, etc.), can result in a constructed environment very different from the designed environment. In addition, the originally selected location may not provide the desired effect, necessitating the relocation of the projection system or the destruction and rebuilding of portions of the set.

The destruction and reconstruction of a set, particularly when rockwork is involved, is costly and time consuming. In a theme park attraction, the rock-work alone can cost in the millions of dollars. Therefore, it is desirable to avoid modifying a set once it has been constructed. However, with prior art projection schemes, set reconstruction is often the only alternative.

The perspective and location of a projected image is dependent on the shape, angle, and location of the projection surface, the location and angle of the projector, and the size of the maquette or slide images. Because each of these variables may be changing until days or hours before the attraction is to begin operation, it is difficult if not impossible to complete and implement the projection system in advance of the installation of the attraction. In practice, a system of trial and error is utilized after the set is completed and the projector is installed in order to obtain desired registration of the projected image with the projection surface. The slide images and/or maquette may need to be modified or redone to provide proper scaling and perspective.

Another difficulty with the prior art schemes is the requirement of a projection surface that is designed into the set. It may be desired to provide a projected effect on an existing region of a three dimensional environment, even if that region was not originally designed as a projection surface. This is not practical with existing prior art projection schemes.

There have been prior art attempts to eliminate the need for a relatively flat projection surface by projecting still images or animated images directly onto the three dimensional surfaces. Attempts to project animated images onto three dimensional surfaces are limited to simple effects, such as water ripple, but have been found impractical due to overly complex and/or expensive equipment for more complex image projection.

To project a still image onto a three dimensional surface, the prior art uses a technique whereby a photograph of the projection surface is produced. This photograph is produced using the same objective and condensing optics that will eventually be used for the projection itself. The photograph would include all the perspective and lens-induced distortions of the interaction of the projection system and of the projection surface. A designer then uses this photograph to produce a still image that "registers" with the projection surface. The distortions and perspective characteristics are designed into the still image. When the still image is projected onto the projection surface, the distortions and perspective characteristics are compensated out by the design.

A disadvantage of this scheme is the fact that it is limited to still images. In addition, the process is painstakingly iterative. The designer must periodically project the work in progress onto the projection surface to determine the success of the design registration. This iterative process is time consuming, and impractical for applications where the environment is either evolving, or where there may be a desire to have the effect be transportable to a modified scene or background.

SUMMARY OF THE PRESENT INVENTION

The present invention provides a computer controlled animation projection system. The system permits the projection of animated images onto a three dimensional projection surface, whether or not the surface is originally designed as a projection surface. The system comprises an animation source that can be edited using a processor, a projector, and an interface for coupling the animation source to the projector.

The animation source in the present invention may be a computer or processor coupled to a computer memory, such as a disk drive, and to a visual display. The computer memory is used to store digitized images that can be sequenced to create animated images. Digitized background images and scenes may also be stored in the computer memory. The processor is also coupled to a projector capable of projecting color images. The projector is a single beam projector in the preferred embodiment.

In one embodiment of the invention, animated images are produced by sequentially displaying a series of still images, much like a "flip book" t) effect. The images are displayed on the computer monitor and are projected onto the projection surface. The images may be stored in random access memory (RAM) prior to displaying the images, if desired. The animated image may displayed with a background scene. The background scene is typically a static scene, (non-animated), and is useful in blending the projected image into the projection surface.

The system is designed so that the projected image is part of the computer display of the computer system. Image manipulation tools associated with the computer system, such as a cursor or other positioning device, drawing or painting tools, etc., appear as part of the projected image when in an editing mode. This allows the projected image to be manipulated by animation, paint, drawing, or other programs in real time, so that the results of such manipulation can be viewed simultaneously with their execution.

During operation of the present invention, a projection surface is selected, the projector location is established, and an animation sequence is projected onto the projection surface. The location where the image is intended to be subsequently viewed, and areas of the projection surface upon which no image is to be projected, are identified. Using a paint program, the background or projected frame are edited to "black out" those regions of the projected image that are projected onto those identified portions. This is done while the image is still being projected, so that the changes can be viewed as they are made. The regions of the projected image corresponding to the identified portions of the projection surface are colored black (no light) so that no light is projected onto those identified portions. This is done to allow "blending" of the projected image into the projected surface, reducing artifacts and boundaries that reveal the presence of a projected image.

At boundaries of surface irregularities in the projection surface, the color of the projected image is selected to blend into the surface to aid in disguising the presence of a projected image. The transition of the boundaries of the projected image into the projection surface, (often referred to as a "vignette"), is such that the boundaries of the projected image are substantially invisible.

The projected image may include animated characters that are to appear and move about on the projection surface. For example, the character may traverse a "path" on a computer display that is to correspond to a "path" on an edge or horizon of a projection surface. As a result of construction techniques or design decisions, the path on the projection surface may not correspond to the path on the computer display. To compensate for these differences, the path of the animated character on the display is changed using animation sequencing and editing tools, so that a new path is created that corresponds to the path of the projection surface. This is accomplished easily, since the projected character can be viewed on the computer display and the projection surface at the same time, and the effects of changes of the path on the computer display are seen simultaneously on the path of the projection surface.

BRIEF DESCRIPTION OF THE DRAWINGS

FIG. 1 illustrates a prior art projection scheme.

FIGS. 2A and 2B illustrate a prior art maquette projection scheme.

DETAILED DESCRIPTION OF THE INVENTION

A computer controlled animation projection system is described. In the following description, numerous specific details, such as particular programs, monitor types, projector models are described in order to provide a more thorough description of the present invention. It will be apparent, however, to one skilled in the art, that the present invention may be practiced without these specific details. In other instances well known features have not been described in detail so as not to obscure the present invention.

The projection system of the present invention comprises a graphics capable computer system, a projector for projecting a computer generated image, and image sources that can be edited and manipulated for display. In one embodiment, a sensor is provided to indicate the presence or absence of a trigger event, and an electronic translator to convert the output of the sensor into a signal to enable or initiate the generation and projection of images onto a projection surface.

Figure 3:
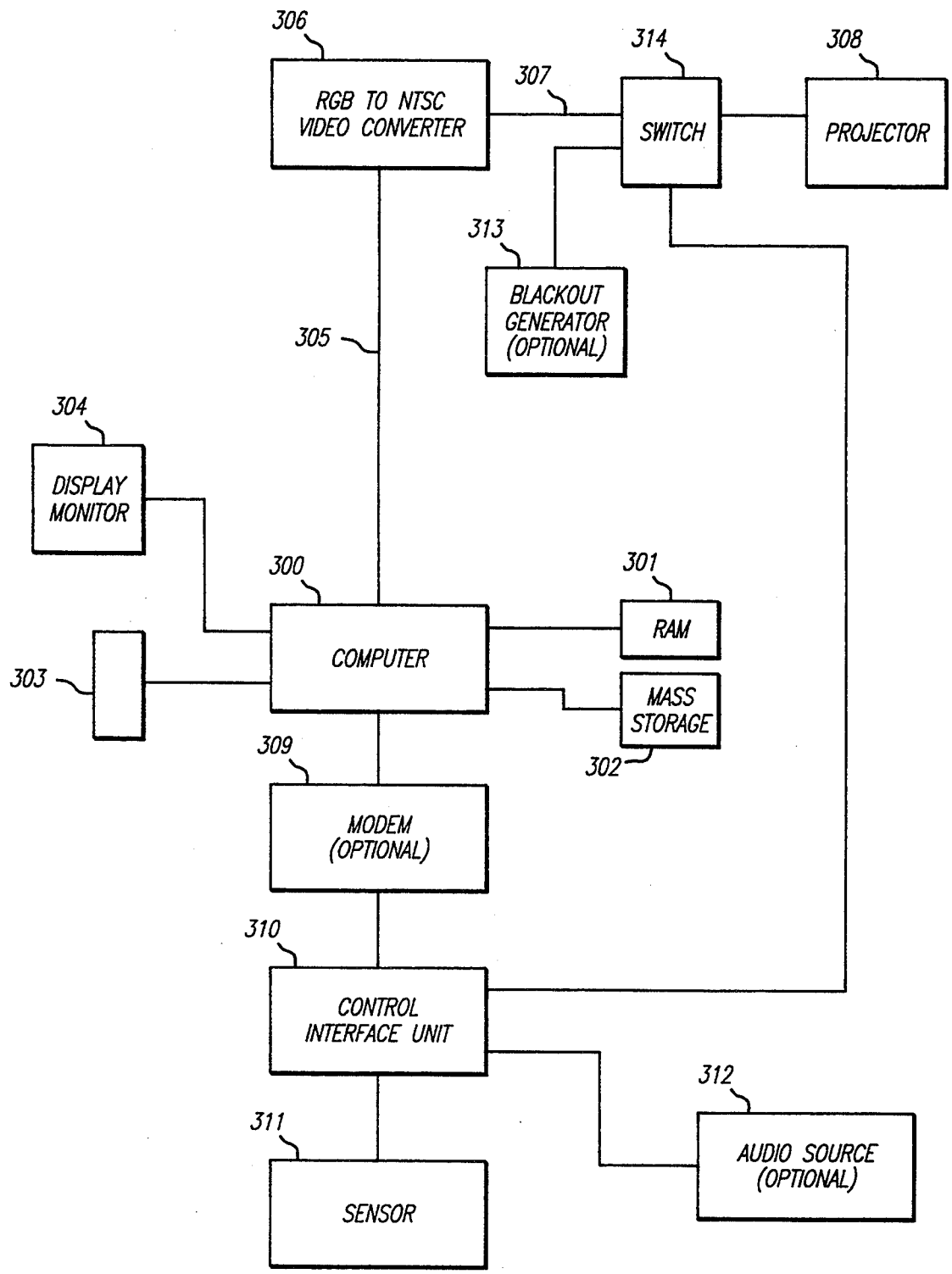
FIG. 3 is a block diagram of the present invention.
Figure 2B:
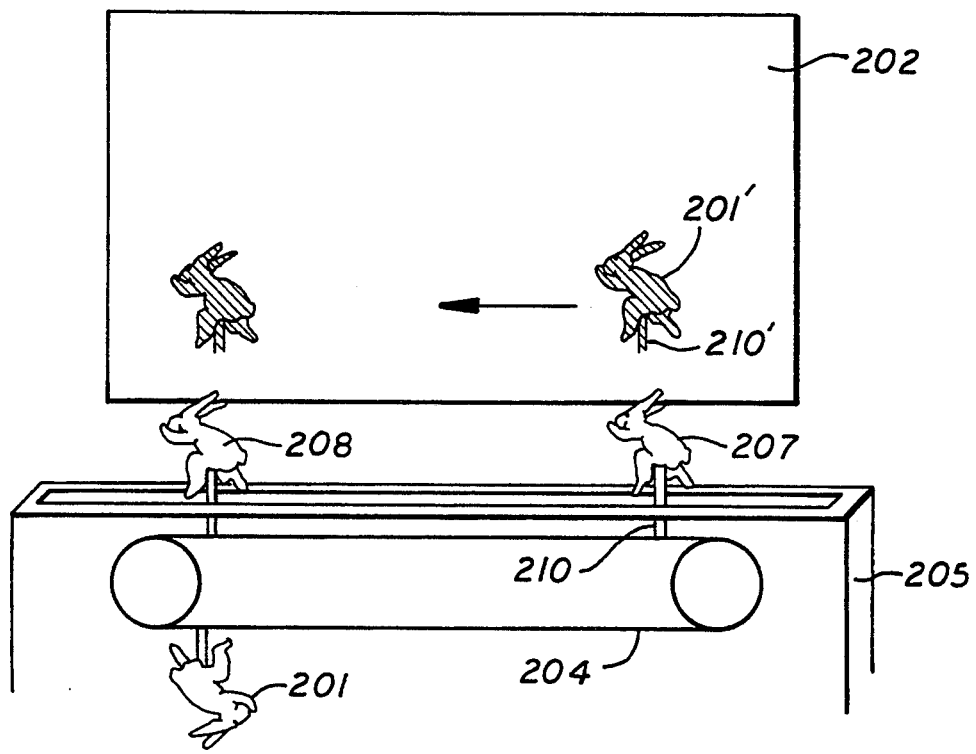

A block diagram of the preferred embodiment of the present invention is illustrated in FIG. 3. A graphics capable computer 300 is coupled to RAM 301, mass storage 302, positioning device 303, display 304, converter 306 and, through optional modem 309, to control interface unit 310. The converter 306 is coupled through line 307 and switch 314 to a projector 308. Control interface unit 306 is coupled to digital audio source 312, to sensor 311, and to switch 314. An optional blackout generator 313 is coupled through switch 314 to projector 308.

The graphics capable computer may be of any type of computer or processing means capable of displaying still or animated graphic images. In the preferred embodiment of the present invention, a Macintosh ® computer, manufactured by Apple Computer, Inc. of Cupertino, Calif., having a Motorola 68030 microprocessor, is utilized. This configuration is given by way of example only, and other computer systems and configurations may be utilized without departing from the scope or spirit of the present invention. Mass storage 302 may be a disk drive, such as a magnetic, optical, or magnetooptical disk drive, a CD ROM drive, a tape drive, or any other suitable mass storage device. Mass storage 302 is used to store graphic images. The graphic images may be created on the computer system itself with a suitable drawing program. Alternatively, they may be created by hand drawing or other means, and scanned into the computer system, digitized, and stored in mass storage 302.

RAM 301 is used as main memory for the computer processor. RAM 301 stores instructions to be executed by the computer processor, data associated with those instructions, other data, and copies of selected images form the images stored in mass storage 302. In the preferred embodiment of the present invention, up to 17 Mbytes of RAM are provided. The present invention may be practiced with other amounts of RAM.

The computer generates images from the data stored in mass storage 302 or RAM 301, and provides these images to display 304 and, on path 305, to converter 306. A positioning device 303 is used to position a pointing device, such as a cursor, or other tools, or to select actions and operations, on the display 304. The positioning device 303 is a mouse in the preferred embodiment, but it may also be a trackball, joystick, touchpad, or any other suitable positioning device.

The display 304 is a color display in the preferred embodiment, but a monochrome display may be utilized as well. The display receives RGB (red, green, blue) video information from computer 300. The computer 300 also provides RGB video information to converter 306 on line 305. Converter 306 is an RGB to NTSC composite video signal converter. The converter 306 converts the RGB signal into an NTSC composite signal, suitable for use with a video projector. The NTSC converter is used when the projector 308 requires NTSC video input. If the projector 308 requires a different input, a different converter is used. Alternatively, a projector 308 that can receive RGB output from the computer 300 may be used, obviating the need for a converter. In this case, the RGB output of the computer is provided directly to the switch 314 or to the projector 308.

The NTSC composite signal is provided on line 307 through optional switch 314 to projector 308. Line 307 is a coaxial cable in the preferred embodiment of the invention. Projector 308 is a single lens color video projector, such as model XV100 manufactured by Sharp ®. The video projector should be capable of projecting video at a rate of approximately 24-30 frames per second. In the preferred embodiment, the projector is a 150 watt projector. Other suitable wattage projectors may be utilized, depending on the specific application.

The control interface unit 310 is used to provide automatic control of the display of images by the projector 308, by providing appropriate signals to the computer 300. Control interface unit 310 receives signals from sensor 311 that indicate when it is appropriate to display projected images. The connection between control interface unit 310 and computer 300 may be a direct connection or may be through optional modem 309. When an appropriate signal is received, control interface unit 310 provides an enabling signal to computer 300 and to digital audio source 312. Upon receipt of the enabling signal, the computer 300 provides appropriate video signals to the converter for conversion into NTSC composite format and for ultimate display as a projected image from projector 308. When the digital audio source 312 receives an enabling signal, audio is provided to be played in connection with projected images.

An optional blackout generator 313 may also be provided, coupled to the the projector 308 through optional switch 314. If the output of the computer system 300 is not correct or cannot be verified, the control interface unit causes the switch 314 to select the output of the blackout generator 313 instead of the output of the converter 306. The output of the blackout generator 313 causes the projector 308 to project black (nothing). This can be used to hide mistakes or errors from observers of the projected image by preventing the projection of anything at all. Therefore, there is no evidence of a projection system when the blackout generator is enabled.

The sensor 311 is an electro-optical or other suitable sensor in the preferred embodiment of the present invention. The sensor is used in connection with a ride vehicle for carrying audience members through a theme park attraction. The presence of a ride vehicle causes an enabling signal to be generated so that a projected image and sound is provided to be seen and heard by audience members in the ride vehicle. The audio source is digital in the preferred embodiment, but may be analog if desired.

Figure 9A:
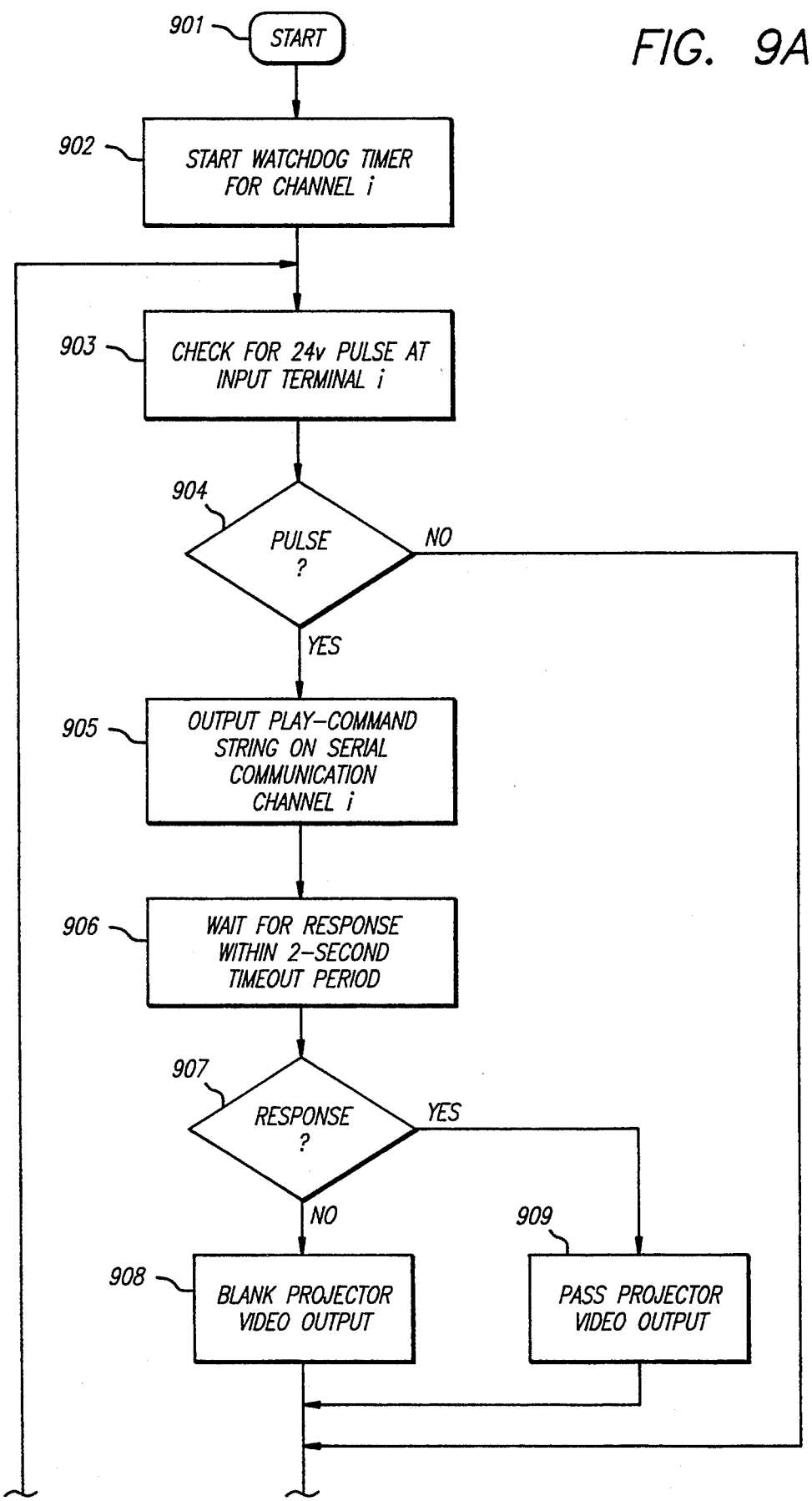
FIGS. 9A and 9B illustrate the operation of the control interface unit of FIG. 3.
Figure 9B:
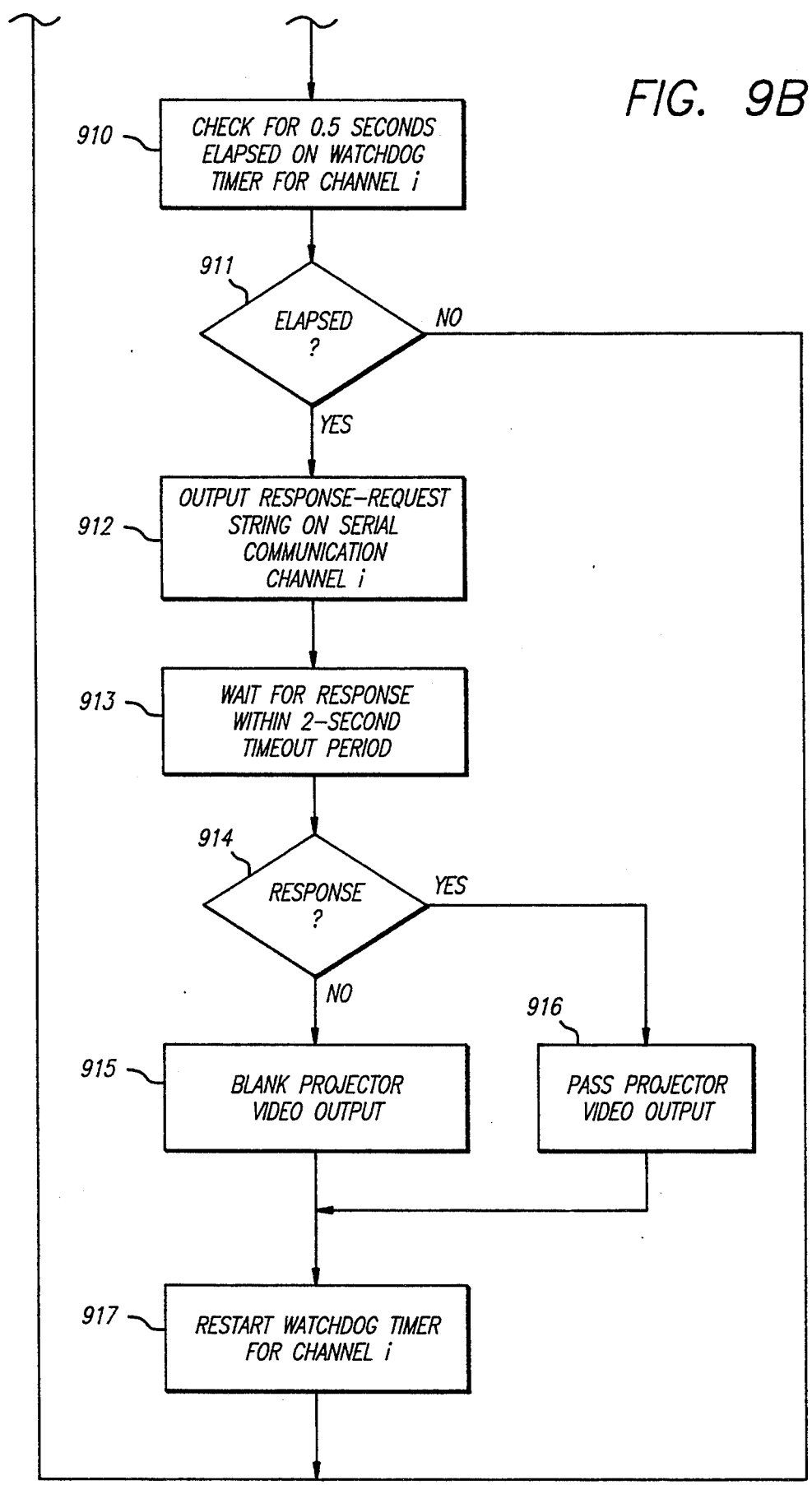

The operation of the control interface unit 310 is illustrated in the flow chart of FIG. 9. At step 901, the operation begins. At step 902, the control interface unit initiates a timer, referred to as a "watchdog" timer, for channel i. Channel i is a serial communication channel that connects the control interface unit 310 to the computer 300. The control interface unit may be coupled to one or more computers.

At step 903, the control interface unit checks for a pulse (e.g. a 24 volt pulse), at the input terminal of channel i. At decision block 904 the argument "Pulse?" is made. If the argument is false, the system proceeds to step 910. If the argument at decision block 904 is true, the system proceeds to step 905. At step 905, the control interface unit outputs a "play" command string on serial communication channel i.

At step 906, the control interface unit waits for a response, (an acknowledgement) from the computer system for some time period, (e.g. two seconds). At decision block 907 the argument "Response?" is made. If the argument is true, the control interface unit proceeds to step 909 and provides an enable signal to pass the video output to the projector. If the argument at decision block 907 is false, meaning a response is not received from the computer, the control interface unit at step 908 assumes the computer system is malfunctioning and enables the switching means so that the output of the blackout generator is provided to the projector.

After either step 908 or 909, or when the argument at decision block 904 is false, the control interface unit proceeds to step 910. At step 910, the control interface unit checks the communication channel i for some time period (e.g. 0.5 seconds). At decision block 911 the argument "Elapsed?" is made. If the argument is false, the system returns to step 903 to check for a pulse at input terminal i. If the argument at decision block 911 is true, meaning the time period has elapsed, the control interface unit proceeds to step 912.

At step 912, the control interface unit outputs a response-request string on communication channel i. The control interface unit then waits for a response during a time-out period, (e.g. two seconds). At decision block 914 the argument "Response?" is made. If the argument is true, meaning that a response has now been received, the control interface unit enables the switching means to provide the video output to the projector at step 916. If the argument at decision block 914 is false, the control interface unit enables the switching means to provide the output of the blackout generator to the projector at step 915. After either step 915 or 916, the control interface unit restarts the timer for the communication channel i and returns to step 903.

For purposes of illustration, the preferred embodiment of the present invention is described in connection with its use in an exemplary theme park attraction. The attraction is a ride where riders sit in a raft and are "floated" on an artificial stream through a mountain that includes tunnels, waterfalls, rapids, etc. A portion of the ride traverses inside the mountain, passes through tunnels, and under overhangs. The mountain is artificial, constructed of a frame covered in part with rock-work to make it look like an actual mountain. It is desired to provide animated images on certain areas of the rock-work to add to the detail of the fantasy environment created for the attraction.

Figure 4A:
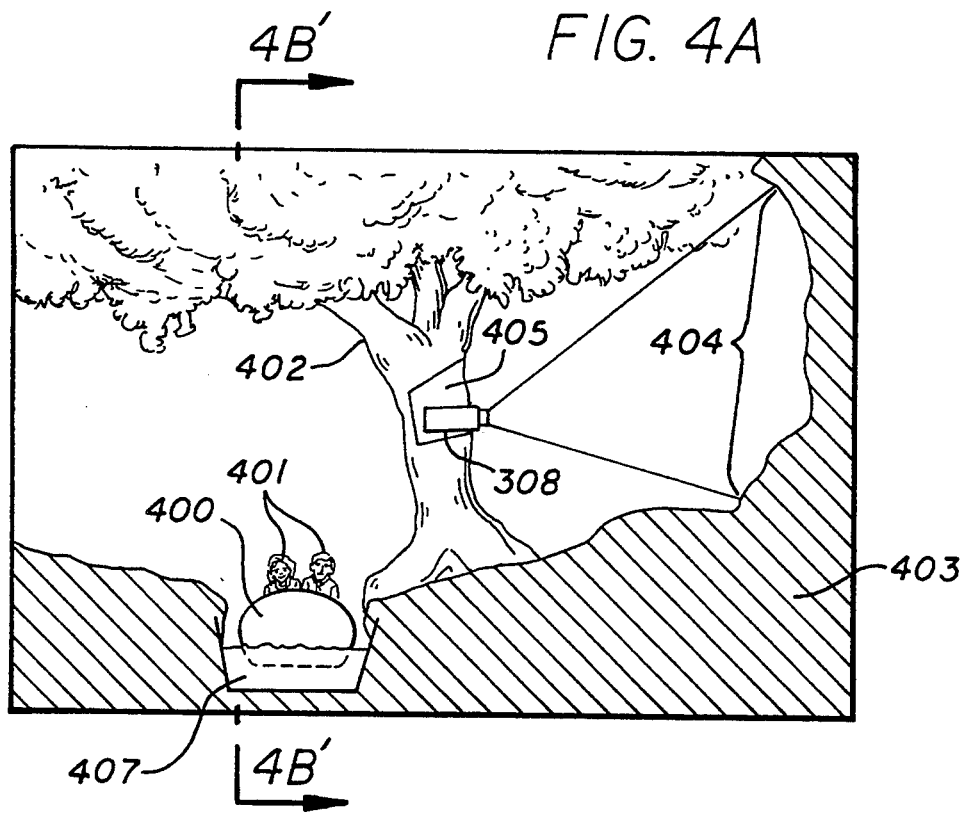
FIG. 4A illustrates one embodiment of the present invention.
Figure 4B:
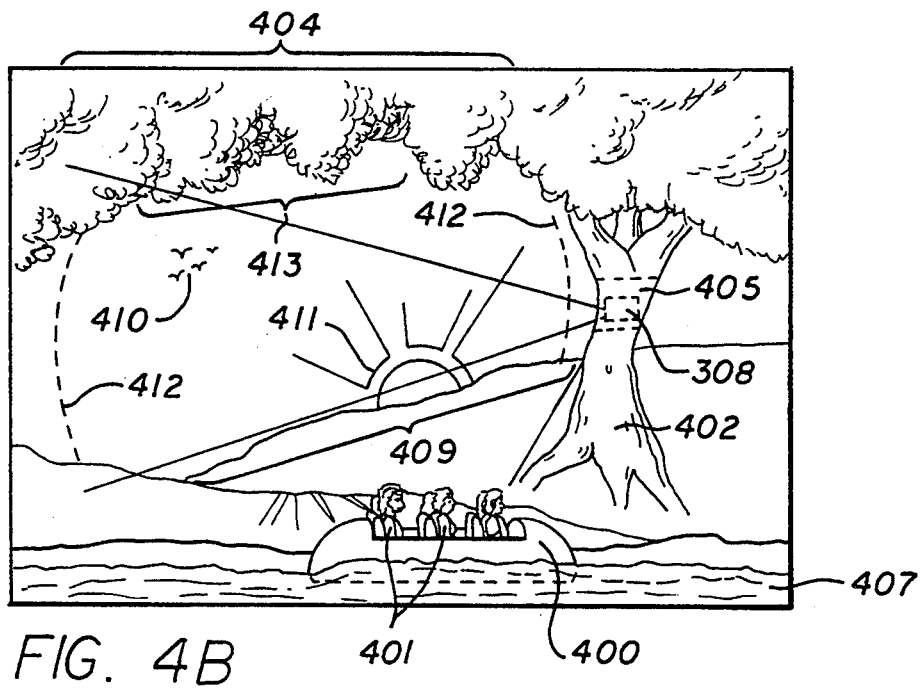
FIG. 4B is a view of FIG. 4A along section line 4B'-4B'.

An illustration of one such region where animated image is projected is illustrated in FIGS. 4A and 4B. FIG. 4A illustrates a stream 407 in which a boat 400 is floating. The boat 400 includes passengers 401. The region through which the boat 400 is floating includes rock-work 403 and a tree 402. A cutout 405 is formed on the side of the tree 402 opposite the passengers 401. A projector 308 is mounted in the opening 405 such that an image can be projected onto projection surface 404. As can be seen in FIG. 4A, the projection surface is not flat, but includes three dimensional features.

As the boat 400 travels into the region represented by FIGS. 4A and 4B, a sensor, (not shown) is activated, sending an enabling signal to the control interface unit of FIG. 3. This in turn activates the computer system 300 to produce images that are provided to the projector 308. The projector 308 then projects a projected image onto projection surface 404.

Referring now to FIG. 4B, the projected image includes flying birds 410, and a rising sun 411. These are both animated projected images. The boundary of the projected image is colored to blend into the projection surface, so as to make the boundary substantially invisible, as represented by dashed line boundary 412 of FIG. 4B.

There are a number of regions of the projection surface that require registration of the projected image so that the projected image will appear as natural as possible. For example, the sun appears to rise from behind the top boundary 409 of the stream bank. Therefore, the sun should not be projected onto the projection surface below the boundary 409. Similarly, the boundary 413 of the leaves of the tree 402 create a boundary with the sky. The animated birds 410 should not appear to fly above that boundary 413. The present invention provides a system for easily manipulating the images so as to provide a method for registering the images with projection surface boundaries. This functionality is discussed in connection with FIGS. 5A–7C.

The embodiment of the invention discussed in connection with FIGS. 4A and 4B is provided for purposes of example only. The present invention has application in any environment where it is desired to project an image onto a projection surface.

Figure 5A:
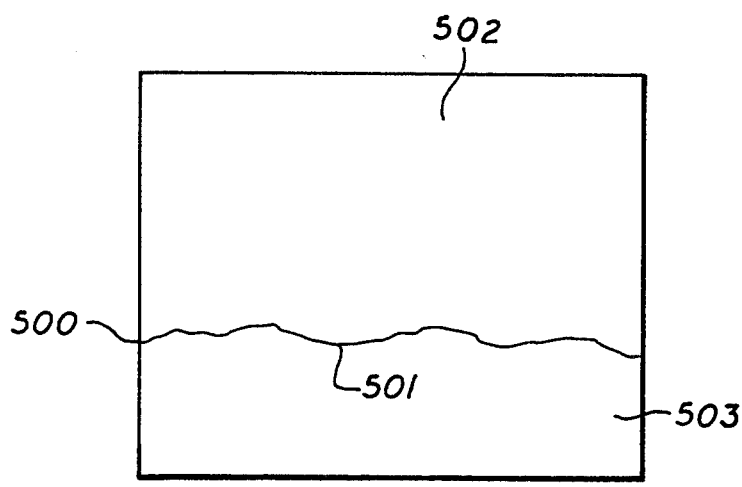
FIGS. 5A–5B illustrate a predesigned projection surface and animation sequence.

Referring to FIG. 5A, a design for a region of rock-work that is to be used as a projection surface is illustrated. The design includes a region 502 representing sky, and a region 503 representing ground, or rock-work. the boundary 501 between the ground 503 and sky 502 is a horizon designed to be a path for animated images. The path represented by boundary 501 is substantially horizontal, coinciding with a height shown by point 500 in FIG. 5A. FIG. 5A is a designed region. The actual rock-work in the region is intended to correspond to this design.

Figure 5B:
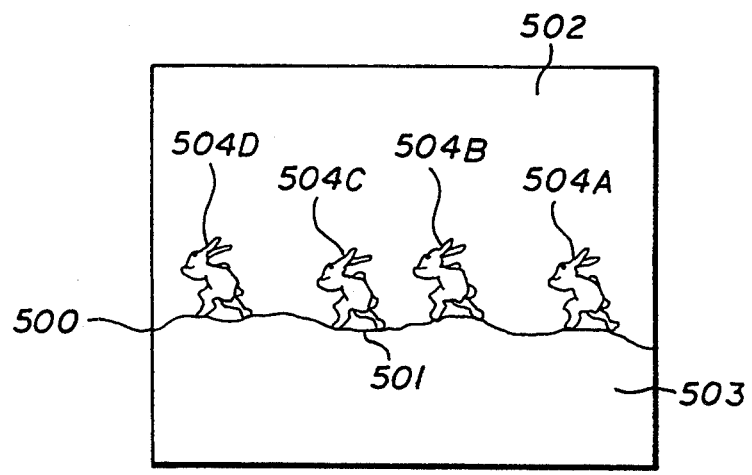

Based on this design, an animation sequence that is to be projected onto the region is prepared. If the example animation sequence is to be such that an animated character hops along the path of the boundary 501, so that it looks as if the animated character is moving along the horizon from right to left. This animation sequence is illustrated in FIG. 5B. The animated character, (e.g., a rabbit), appears at the right of the region at location 504A. The character is placed so that his feet appear to touch the horizon of boundary 501.

The character then is animated to hop so that it appears to land on the horizon again at location 504B. The hops continue so that the character lands on the horizon at locations 504C and 504D, respectively. The character then hops out of frame to the left and the animation sequence is ended.

Figure 6A:
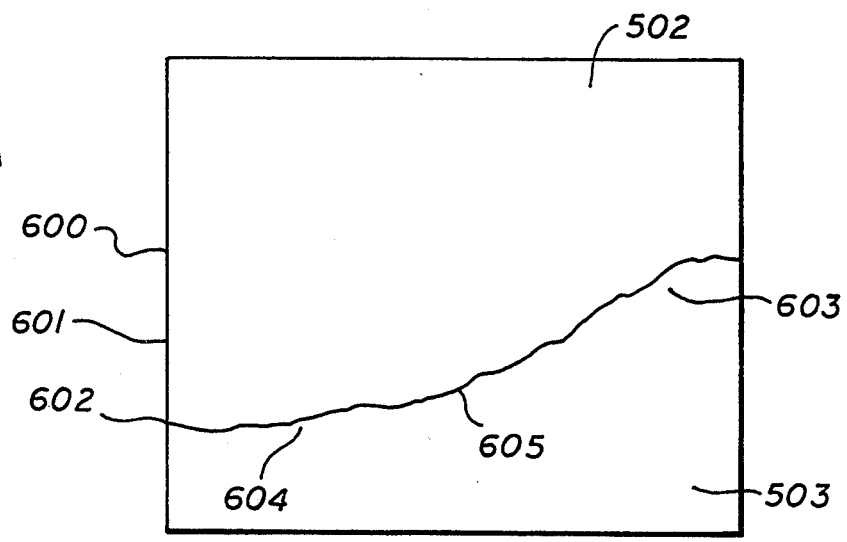
FIGS. 6A–6C illustrate an actual projection surface and animation sequence.

As noted above, the reality of set construction is such that variations in the constructed set from the designed set often occur. Referring now to FIG. 6A, the actual set region constructed from the design of FIG. 5A is illustrated. The horizon 605 between the sky 502 and ground 503 is no longer substantially horizontal. The horizon 605 includes a first region 603 that begins at a height represented by point 600, higher than the height represented by point 500 of FIG. 5A, and slopes sharply down and to the left to a height represented by point 601. The second region begins at point 601 and slopes more gently downward and to the left to a height represented by height 602, lower than the height represented by point 500 of FIG. 5A.

Figure 6B:
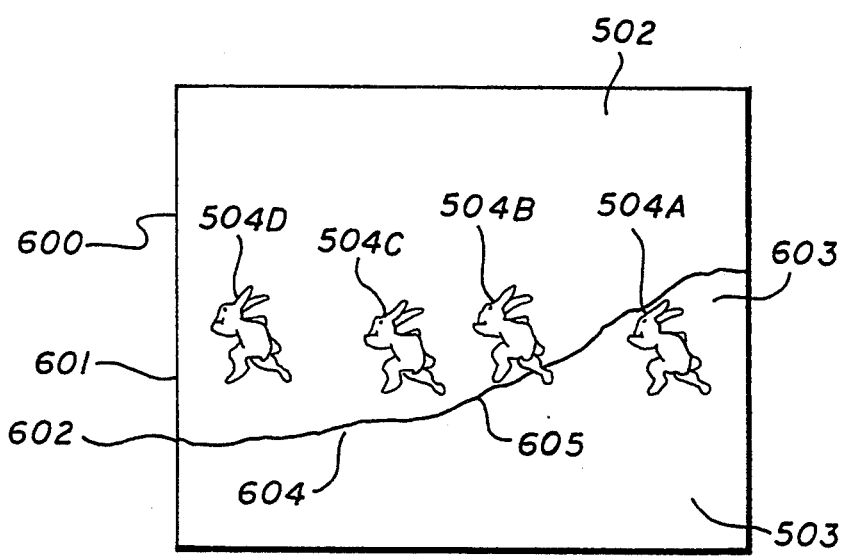
Figure 6C:
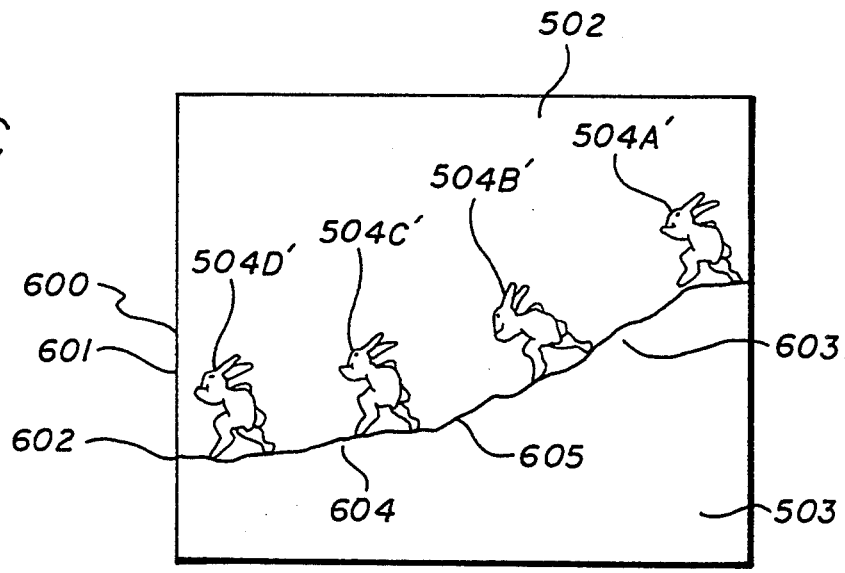

If the animation sequence designed as in FIG. 5B is projected onto the projection surface of FIG. 6A, misregistration of the projected image with the projection surface results. This misregistration is illustrated in FIG. 6B. The character appears projected at location 504A, seemingly in front of the ground below the horizon. After a first hop, the character appears at location 504B, partially in front of the ground and partially in front of the sky. After the second hop, the character appears at location 504C, approximately on the horizon. The next hop brings the character to location 504D, above the horizon so that the character appears to be floating in space. Such misregistration detracts from the nature of the environment of the attraction, making it seem less real.

Using the present invention, the existing animation sequence can be edited so that it may be used with the actual projection surface. Any of several commercially available animation software packages, such as Director ®, made by Macromind-Paracomp, can be used to edit the animation sequence. The system of the present invention allows the animation sequence to be edited as it is projected onto the projection surface. The path of the character of the animated sequence can be defined to correspond to the path of the actual projection surface.

The locations 504A–504D are referred to as "key frames". By establishing the position of the key frames, the animation software interpolates the sequence between the key frames to provide appropriate motion of the characters between the key frames. Referring to FIG. 6A, the frame representing the character at location 504A is selected and moved to location 504A'. Location 504A' is selected so that the the character is registered with the horizon 605.

A second key frame, corresponding to location 504B, is selected to further define the path of the animated character. The animation program is used to select the character at location 504B and redefined at location 504B'. Again, the character at location 504B' is registered with the horizon 605. The animation program is used to control the movement of the character between the key frames. In the example shown, the character is hopping between those locations, so the only requirement of the path between key frames 504A' and 504B' is that the character remain above the horizon. The movement of the character is referenced to the key frames, so that the movement will be above the horizon.

The remaining key frames are selected where the character is intended to be on the horizon, namely at locations 504C and 504D. The character at these locations is redefined at locations 504C' and 504D'0 so that it is registered with the horizon at those locations.

Figure 7A:
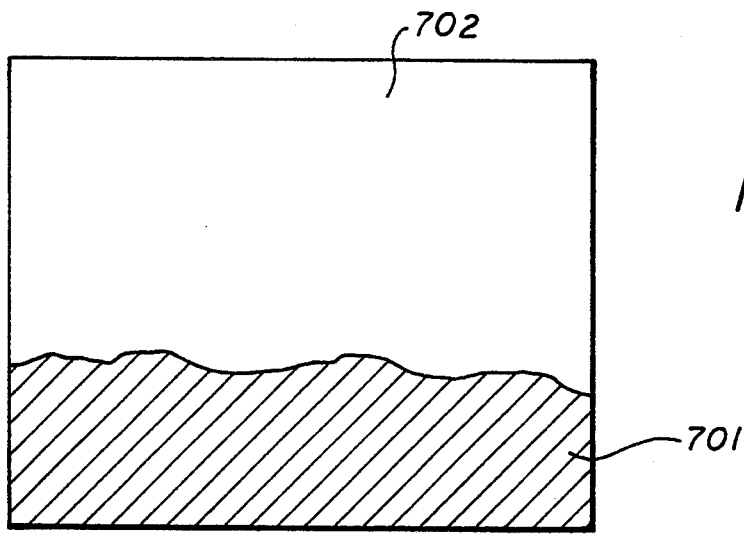
FIGS. 7A–7C illustrate several embodiments of a background scene.

A background scene is often projected onto the projection surface with the animation sequence. The background is static and is used to help mask the edges of the projected image to enhance the perception of reality. Often, the background scene is also desired to be registered with the projection surface. Referring to FIG. 7A, a background scene intended to be used with the designed projection surface of FIG. 5A is illustrated. The background scene includes a lower region 701 of a dark color (e.g. black) so that nothing is projected onto the rock-work of the projections surface.

The background scene of FIG. 7A is not appropriate to be used with the actual projection surface of FIG. 6A. The region 603 of rock-work of the projection surface of FIG. 6A extends above the dark colored region 701 of the background of FIG. 7A. This results in light being projected onto the rock-work, making it more obvious that a projection is taking place. Using the present invention, the background can be edited, using a paint program, such as Studio 8 ®, made by Electronic Arts of San Mateo, Calif. MacPaint ®, made by Claris Corporation, SuperPaint ®, made by Silicon Beach Software, or any other suitable paint or graphics editing program.

Figure 7B:
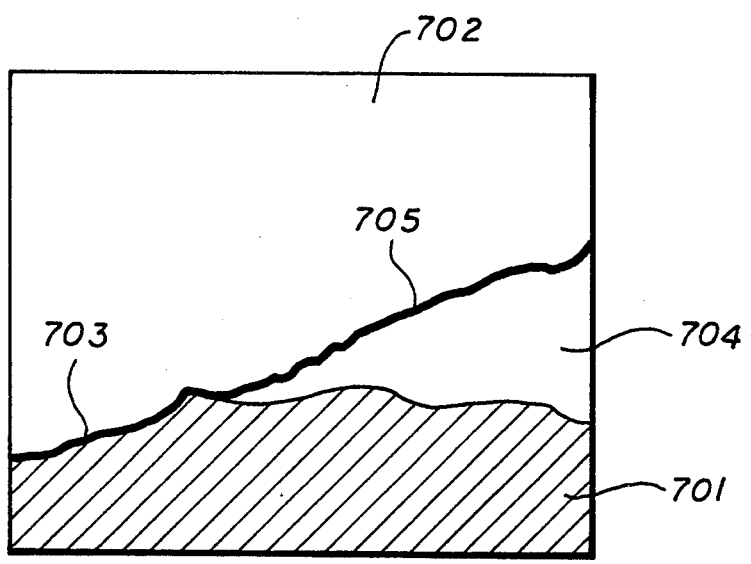
Figure 7C:
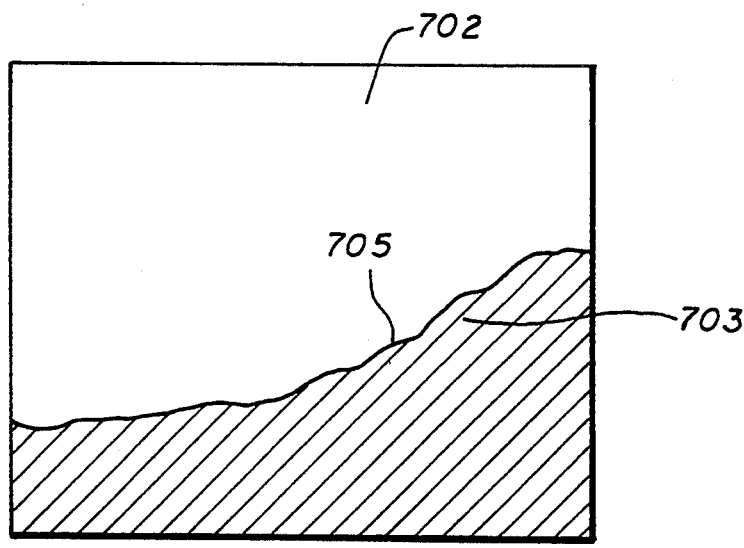

Referring now to FIG. 7B, the background scene is edited to make it correspond with the actual rock-work of FIG. 6A. The dark region is partially removed at region 703, lowering the dark region to register with the lower rock-work level of the actual projection surface. A new boundary 705 is drawn, using a paint program, to register with the rock-work boundary of FIG. 6A. This boundary 705 defines a region 704 between the boundary 705 and the original dark region 701. This region 704 is colored dark or black as desired to provide appropriate blending with the rock-work of the projection surface.

An advantage of the present invention is that the "canvas" used to edit the background scene is the computer system display itself. This display is projected onto the projection surface using the present invention, so that the editing of the background is as easy as "tracing" a new boundary. The results of the editing are displayed instantly.

The present invention reduces the need for costly and time consuming trial and error attempts to obtain registration that are required by prior art methods. In addition, the destruction and reconstruction of sets or rockwork is substantially eliminated using the present invention. The projected images can be resized, edited, repositioned, and/or otherwise manipulated to be registered with the existing set or rock-work, so that no rebuilding need be done. This provides significant savings in time and cost over prior art methods.

In addition to changes based on the physical aspects of the projection surface and the location of the projector, changes to the projected image can be easily made based on time considerations. The travel time of a ride vehicle may not be known until the attraction is completed. The animation sequence may be speeded up or slowed down as necessary to coincide with the travel time of the ride vehicle. If necessary, portions of the animation sequence can be removed or portions added to adjust for desired timing.

The above example is described in connection with the editing of an existing background pattern to match it up with a constructed projection surface. A pre-existing background is not required. The present invention has equal application where the background scene is not pre-existing. For example, the background can be created after the projection surface is constructed. The present invention allows a frame to be projected directly on the projection surface so that simultaneous feed back is provided as the background scene is created.

In addition, the present invention is not limited to the simple edit process described above. More complex manipulation of the background and animation sequences may be performed. For example, the projected image may be resized to compensate for the three dimensional nature of the projection surface, to correct for perspective error due to the angle of the projection path, or create impressions of depth or movement in and out of the plane of the projection surface.

As noted above, the present invention has particular application in a theme park attraction where a one or more customers ride through the attraction, and the projected image or animation sequence is triggered by the presence of the customer or a ride vehicle or other craft used to transport the customer through the attraction. The present invention uses a software interface to control the triggering of the image projection. The software interface receives the signal from the ride sensor and enables an animation program, such as Director ®, made by Macromind-Paracomp, Inc., to project the image at the appropriate time.

In the preferred embodiment of the present invention, the software interface is implemented in HyperCard ®, made by Apple Computer Inc. of Cupertino, Calif. Table 1 below is pseudo code of a HyperCard script used in the invention.

TABLE 1

```
on idle global initFlag

- IF THIS IS THE FIRST TIME IDLE IS ENTERED
   if initFlag is empty then
   -- SET THE CURSOR TO BLANK -- DISPLAY THE BACKGROUND CONTINUOUSLY
   PlayAccel "BACKGROUND",movieNoUpdate -- PRELOAD THE SHOW TO ALLOW IMMEDIATE RESPONSE
   PlayAccel "SHOW",moviePreLoad -- INITIALIZE THE SERIAL PORT
   configureSPort modemPort,baud9600,data8,stop1O,parityOFF
   setSPortPufferSize 1000 put 1 into initFlag
   end if

-- GET THE COMMAND STRING
   put recvUpTo(return,6,empty) into cmdStr

-- IF THE COMMAND IS "PLAY" THEN
   if ccdStr contains "PL" then

-- SEND ACKNOWLEDGE
   sendSPort "R"&return

-- RESET THE CURSOR TO BLANK IN CASE IT WAS RESTORED

--PLAY THE SHOW
   PlayAccel movieNoUpdate

-- ELSE IF THE COMMAND IS "STILL" (WATCHDOG FUNCTION) THEN
   else if cmdStr contains "ST" then -- SEND ACKNOWLEDGE
   sendSPort "R"&return end if end idle
```

TABLE 1-continued

-- RESET "HAND" CURSOR IF TAB KEY IS HIT

--RESET 'HAND" CURSOR IF RETURN KEY IS HIT

--RESET "HAND" CURSOR ON EXIT

Figure 8:
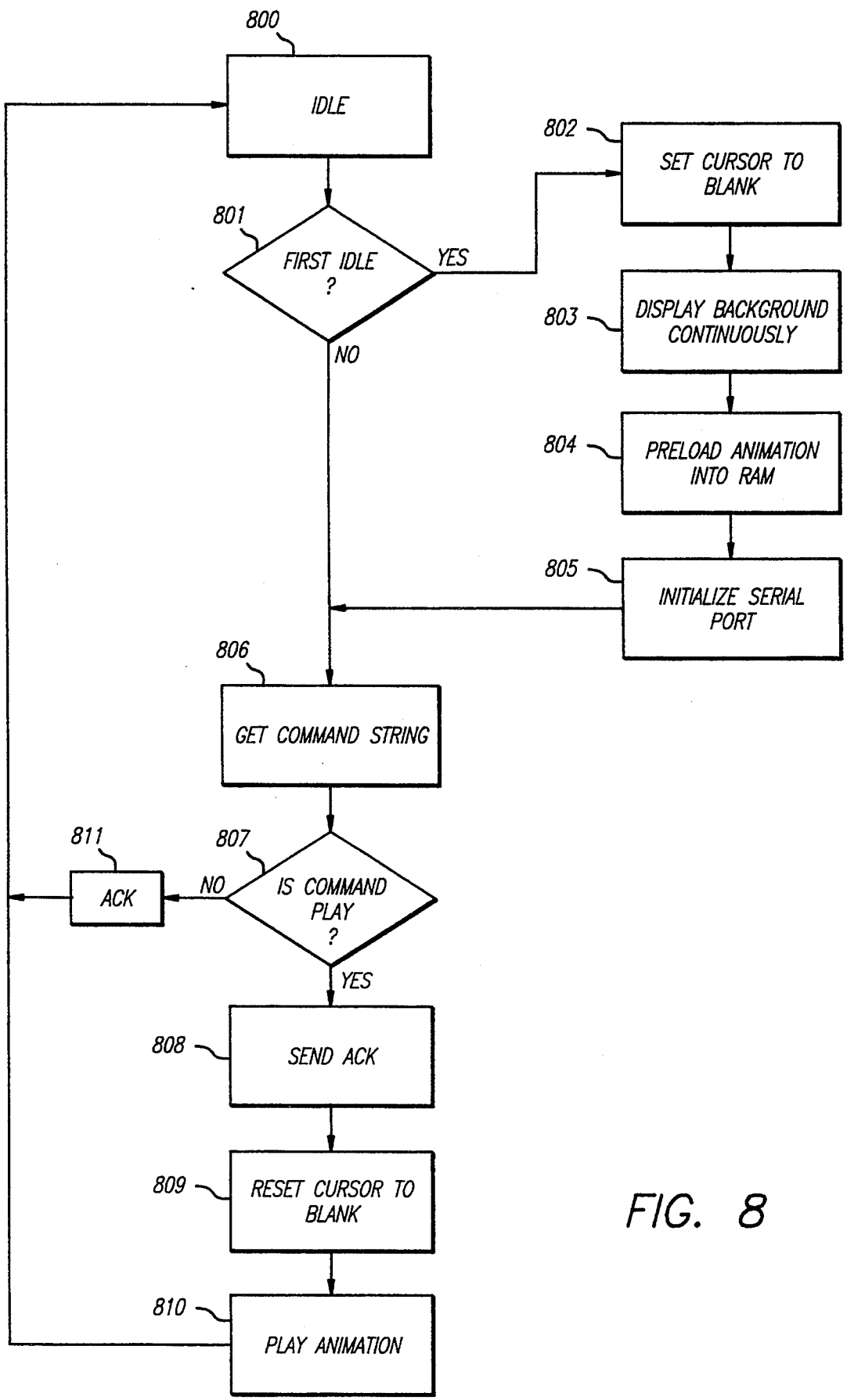
FIG. 8 is a flow diagram illustrating the sequencing of operation of the present invention in one embodiment.

The operation of the software interface is described in connection with the flow diagram of FIG. 8. At step 800, the system enters a state referred to as "idle". At decision block 801, the argument "First idle?" is made. This is to determine fi the system has just been initialized or if it is in a running state. If the argument at decision block 801 is true, meaning that the system has just been initialized, steps 802–805 are executed.

At step 802, the cursor is set to blank. Because the computer system projects its own display as the projected image (through the projector 308 of FIG. 3), it is possible that a cursor or other positioning icon may be visible. This step is used to blank out the cursor to prevent it from being seen by customers. At step 803, any background scene is opened and displayed continuously.

At step 804, the animation sequence is preloaded into RAM. This permits the substantially instantaneous display of the execution sequence when an enabling signal is received. At step 805, the port with which the computer system communicates with the control interface unit is initialized. In the preferred embodiment, the port is a serial port, and it may be coupled to the control interface unit via a modem. This step thus initializes the modem, sets the appropriate parameters and sets up a buffer for receiving commands from the control interface unit via the port.

After step 805, or when the argument at decision block 801 is false, the system proceeds to step 806. At step 806, the system retrieves the command string from the buffer of the serial port. At decision block 807 the argument "Is command Play?" is made. This is to determine if the sensor has detected a ride vehicle, (command is "Play"), or not, (command is "Still"). If the argument at decision block 807 is true, (command is Play), the system executes steps 808–810.

At step 808, the system sends an acknowledge to the serial port, to notify that the command has been received. At step 809, the cursor is reset to blank. This is to hide the cursor, if it has been somehow reset after the execution of step 802. At step 810, the animation sequence is played and projected. Any associated audio is also played back at this time.

If the argument at decision block 807 is false, (command is Still), the system acknowledges the command at step 811. After step 811 or 810, the system returns to step 800 and reenters the idle state.

In an optional embodiment, the system provides for a blackout of the projector when the computer system does not acknowledge the commands. This is to prevent the projection of incorrect or mistimed images, or other noticeable erroneous images, to preserve the reality of the projection surface.

The present invention can also be utilized when the projection surface is not originally designed as a projection surface. For example, consider the situation where an existing rock-work surface includes an outcropping of rock and it is desired to provide an effect whereby the outcropping appears to heat up to the point of brightly glowing, and then appears to crack. Using the system of the present invention, a projector is mounted so that it projects an image onto the outcropping. Using a paint program, a series of colors are projected onto the outcropping, making it appear as if the outcropping is heating up and glowing by progressively adjusting the color and intensity of light from the projector that is "bathing" the outcropping. cracking lines are then projected directly onto the outcropping, making it appear as if cracks are forming. By saving the images as an animation sequence, and projecting them back onto the outcropping of the projection surface, the desired effect is achieved.

The present invention has been described in connection with projection of an image onto a projection surface using a computer. However, after the final images to be projected are defined, using the computer system, the images may be transferred to another medium for projection if desired. For example, the image may be stored on a video disk. The video disk is then played back and the images are projected as described above. Other means of storing and replaying images may be utilized as well without departing from the scope of the invention.

Thus, a computer controlled animation projection system has been described.

We claim:

1. An apparatus for projection animation onto a projection surface comprising:

processing means;

storage means coupled to said processing means for storing images for displaying as an animated sequence, said processing means for providing a video signal of said animated sequences;

projection means coupled to said processing means for receiving said video signal and for projecting said animated sequence onto a projection surface; and, editing means coupled to said processing means for interactively modifying said animated sequence to conform to dimensional variations of said projection surface.

2. The apparatus of claim 1 further including sensing means coupled to said processing means, said sensing means for selectably providing a first enabling signal to said processing means.

3. The apparatus of claim 2 further including switch means having first and second switch inputs and a first switch output, said first switch input coupled to said processing means for receiving said video signal, said second switch output coupled to an output of a blackout generating means, said switch means for selectably coupling one of said first and second switch inputs to said first switch output, said first switch output coupled to said projection means.

4. The apparatus of claim 3 further including a control signal coupled to said switch means for enabling selection of one of said first and second switch inputs.

5. The apparatus of claim 1 wherein said animated sequence is stored as a series of digitized images.

6. The apparatus of claim 1 wherein a sensor is coupled to said processing means through a control interface unit.

7. The apparatus of claim 1 further including display means coupled to said processing means for displaying said video signal.

8. The apparatus of claim 1 further including input means coupled to said processing means for providing editing instructions to said editing means.

9. The apparatus of claim 1 further wherein said projection surface is a three-dimensional surface.

10. A method of projecting animated images on projection surface, said method comprising the steps of:
   storing images in a storage means;
   providing said images stored in said storage means to a processing means;
   generating sequences of said images in said processing means to create animated images;
   generating a video signal of said animated images;
   providing said video signal to a projection means;
   generating a projection image from said video signal using said projection means;
   projecting said projection image on a projection surface, using said projection means; and,
   interactively modifying said animated sequence to conform to dimensional variations of said projection surface using editing means, said editing means coupled to said processing means.

11. The method of claim 10 further including the steps of:
   generating a video signal of said animated images in a first format;
   converting said video signal of said first format into a video signal of a second format before providing said video signal to said projection means.

12. The method of claim 11 wherein said first format comprises RGB video.

13. The method of claim 12 wherein said second format comprises NTSC video.

14. The method of claim 10 further including the steps of:
   monitoring a sensor for a detection signal having a first state and a second state, said detection signal is in said first state when said sensor detects a predetermined event;
   providing said detection signal to said processing means;
   enabling said generation of said video signal only when said detection signal is in said first state.

15. The method of claim 11 wherein said predetermined event comprises a vehicle passing said sensor.

16. The method of claim 10 wherein said projection surface comprises a three dimensional surface.

17. In a theme park ride having at least one light controlled region and a transportation means for transporting customers to said light controlled region, said light controlled region including a projection surface a system comprising:
   storage means for storing images;
   processing means coupled to said storage means for receiving said images stored in said storage means, said processing means generating sequences of said images to create animated images, said processing means generating a video signal of said animated images;
   projection means coupled to said processing means for receiving said video signal, said projection means generating a projection image from said video signal, said projection means projecting said projection image on a projection surface, and,
   editing means coupled to said processing means for interactively modifying said animated sequence to conform to dimensional variations of said projection surface.

18. The system of claim 17 further including:
   converting mean coupled to said processing means and to said projection means for converting said video signal from a first format into a video signal of a second format.

19. The system of claim 18 wherein said first format comprises RGB video.

20. The system of claim 19 wherein said second format comprises NTSC video.

21. The system of claim 17 further comprising:
   a sensor coupled to said processing means for detecting the presence and absence of said transportation means;
   said sensor for providing a signal enabling generation of said video signal when presence of said transportation means is detected.

22. The system of claim 17 wherein said projection surface comprises a three dimensional surface.

23. The method of claim 10 further wherein said projection surface is a three-dimensional surface.

24. The system of claim 17 further wherein said projection surface is a three-dimensional surface.

25. In a theme park ride having at least one light controlled region and a transportation means for transporting customers to said light controlled region, said light controlled region including a projection surface, a system comprising:
   storage means for storing images;
   processing means coupled to said storage means for receiving said images stored in said storage means, said processing means generating sequences of said images to create animated images, said processing means generating a video signal of said animated images;
   projection means coupled to said processing means for receiving said video signal, said projection means generating a projection image form said video signal, said projection means projecting said projection image on said projection surface;
   a sensor coupled to said processing means for detecting the presence and absence of said transportation means; and,
   said sensor for providing a signal enabling generation of said video signal when presence of said transportation means is detected.

26. The system of claim 25 further including:
   converting means coupled to said processing means and to said projection means for converting said video signal from a first format into a video signal of a second format.

27. The system of claim 26 wherein said first format comprises RGB video.

28. The system of claim 27 wherein said second format comprises NTSC video.

29. The system of claim 25 wherein said projection surface comprises a three dimensional surface.

30. A method of projecting an image on a projection surface, said method comprising the steps of:
   storing an image in a storage means;
   providing said image stored in said storage means to a processing means;
   generating a video signal of said image;

providing said video signal to projection means;

generating a projection image from said video signal using said projection means;

projecting said projection image on said projection surface, using said projection means;

displaying said image on a display means; and, interactively modifying said image in editing means to conform said image to dimensional variations of a projection surface, said editing means coupled to said processing means.

31. The method of claim 30 further including the steps of:

generating a video signal of said image in a first format;

converting said video signal of said first format into a video signal of a second format before providing said video signal to sad projection means.

32. The method of claim 31 wherein said first format comprises RGB video.

33. The method of claim 32 wherein said second format comprises NTSC video.

34. The method of claim 30 further including the steps of:

monitoring a sensor for a detection signal having a first sate and a second state;

providing said detection signal to said processing means;

enabling said generation of said video signal only when said detection signal is in said first state.

35. The method of claim 34 wherein said detection signal is in said first state when said sensor detects a predetermined event.

36. The method of claim 35 wherein said predetermined event comprises the presence of a vehicle at said sensor.

37. The method of claim 30 wherein said projection surface comprises a three dimensional surface.

38. The method of claim 30 including input means coupled to said processing means for providing editing instructions to said editing means.

* * * * *